(12) United States Patent
Toelge et al.

(10) Patent No.: US 7,755,475 B2
(45) Date of Patent: Jul. 13, 2010

(54) DEVICE FOR BRAKE LIGHT CONTROL

(75) Inventors: Thomas Toelge, Munich (DE); Alexander Meske, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 384 days.

(21) Appl. No.: 11/826,172

(22) Filed: Jul. 12, 2007

(65) Prior Publication Data
US 2008/0023273 A1    Jan. 31, 2008

(30) Foreign Application Priority Data
Jul. 12, 2006  (DE) .................. 10 2006 032 170
May 7, 2007   (DE) .................. 10 2007 021 242

(51) Int. Cl.
*B60Q 1/44* (2006.01)
(52) U.S. Cl. .................. 340/479; 340/463; 340/464; 340/466; 340/467; 340/472; 340/539.19; 340/988; 340/996; 701/70; 188/1.11 E
(58) Field of Classification Search .......... 340/479, 340/463, 464, 466, 467, 472, 539.19, 988–996
See application file for complete search history.

(56) References Cited

U.S. PATENT DOCUMENTS

| | | | | |
|---|---|---|---|---|
| 3,794,972 A | * | 2/1974 | Van Ostrom | 340/467 |
| 3,846,749 A | * | 11/1974 | Curry | 340/467 |
| 4,357,594 A | * | 11/1982 | Ehrlich et al. | 340/467 |
| 6,147,600 A | | 11/2000 | Faye | |
| 6,160,476 A | | 12/2000 | Ponziani | |
| 6,351,211 B1 | * | 2/2002 | Bussard | 340/468 |
| 6,473,681 B1 | | 10/2002 | Eckert et al. | |
| 6,628,197 B1 | * | 9/2003 | Poguntke et al. | 340/479 |
| 2003/0122663 A1 | * | 7/2003 | Carlson et al. | 340/467 |
| 2006/0097570 A1 | | 5/2006 | Doerr et al. | |

FOREIGN PATENT DOCUMENTS

| | | |
|---|---|---|
| DE | 43 05 186 A1 | 9/1994 |
| DE | 198 14 574 A1 | 10/1999 |

(Continued)

OTHER PUBLICATIONS

German Search Report dated Dec. 4, 2007 with an English translation of the pertinent portions (Nine (9) pages).

*Primary Examiner*—Benjamin C Lee
*Assistant Examiner*—Ojiako Nwugo
(74) *Attorney, Agent, or Firm*—Crowell & Moring LLP

(57) ABSTRACT

A device for controlling the brake lights in a motor vehicle having a brake system, designed to be operated by outside forces, is described. The device includes a control device for actuating the brakes of the vehicle in such a manner that an automatic braking operation can be carried out as a function of the vehicle operating conditions, and at least one brake lamp which can be actuated by the control device or by a separate control unit. The control device or the control unit may be designed in such a manner that during an automatic braking operation, the brake lamp is switched on below a predefined boundary speed, as a function of a braking pressure determined in the activated brake of the vehicle, or as a function of a parameter correlating to the braking pressure.

23 Claims, 3 Drawing Sheets

FOREIGN PATENT DOCUMENTS

| | | | |
|---|---|---|---|
| DE | 198 17 326 A1 | 10/1999 |
| DE | 198 45 679 A1 | 4/2000 |
| DE | 199 20 096 A1 | 11/2000 |
| DE | 101 07 844 A1 | 8/2001 |
| DE | 100 24 881 A1 | 1/2002 |
| DE | EP1375252 * | 1/2004 |
| WO | WO 2004/028847 A1 | 4/2004 |

* cited by examiner

DEVICE FOR BRAKE LIGHT CONTROL

CROSS REFERENCE TO RELATED APPLICATIONS

This application claims priority to German Patent Application No. 102006032170.7, filed Jul. 12, 2006, and German Patent Application No. 102007021242.0, filed May 7, 2007, the entire disclosures of which are herein expressly incorporated by reference.

BACKGROUND AND SUMMARY OF THE INVENTION

The invention relates to a device for controlling the brake lights on a vehicle with a brake system, designed to be operated by outside forces.

A device for controlling the brake lights in a motor vehicle is known from German Patent Document DE 199 20 096 A1, where, during an automatic braking operation actuated by outside forces, the brake lamps are controlled automatically. This device has proven to be effective in many situations.

The present invention further improves the brake light control device of this type and in particular provides a brake light control that will guarantee a reliable indication of a braking operation even in a lower speed range of the vehicle, especially in a speed range in the vicinity of a vehicle standing still. In particular, the invention prevents brake light flickering.

The details of the invention will be explained in view of the features disclosed in the specification, drawings, and claims below. An important condition for a brake light control device, according to an exemplary embodiment of the invention, is the presence of an automatic braking operation which is not initiated manually by the driver. Another condition includes the undershooting or reaching a predefined speed threshold limit, and the overshooting of a predefined pressure threshold in at least one hydraulic circuit of the activated vehicle brake, for which the brake light is activated.

For this reason, the inventive device for controlling the brake lights includes a control device for controlling the brakes of the vehicle and at least one brake lamp, which can be actuated by using the control device or by using a separate control unit (hereinafter referred to uniformly as the control device). Therefore, the control device is designed in such a manner that an automatic braking operation (i.e. a braking operation actuated by outside forces) can be carried out as a function of the vehicle's operating conditions. The control device is designed, according to an exemplary embodiment of the invention, in such a manner that during an automatic braking operation, the brake lamp is switched on below a predefined boundary speed, as a function of a braking pressure determined in the activated brake of the vehicle, or as a function of a parameter, correlating to the braking pressure. Below the predefined boundary speed (speed threshold limit), the brake light (the at least one brake lamp) is switched on as a function of the braking pressure of the activated brake of the vehicle or a parameter, correlating thereto (measured or calculated and/or estimated parameters, like the brake torque, braking force at the wheel or the like). Preferably the brake light is actuated below the speed threshold exclusively as a function of the braking pressure or the applied parameter that correlates to the braking pressure. It is advantageous for the predefined speed threshold limit to be above the vehicle speed of zero.

Above the speed threshold limit, the brake light (switched on/off) is actuated in a different way, preferably as a function of the vehicle deceleration, determined, for example, by using acceleration sensors.

The predefined speed threshold limit is applicable to a preferred exemplary embodiment of the invention. In particular, the speed threshold limit can be varied automatically as a function of the vehicle speed (e.g., the current actual vehicle speed at the start time of the braking operation or a speed, determined by a time frame, up to the start time of the braking operation) and/or as a function of the tilt of the vehicle about its transverse axis (e.g., owing to the slope of the road).

In order to switch on or off the brake light in the speed range below the specified speed threshold limit, a switch-on braking pressure threshold value and/or a switch-off braking pressure threshold value (which is preferably different from the switch-on braking pressure threshold value) may be specified. It is advantageous for the exemplary switch-off braking pressure threshold value to be smaller than the switch-on braking pressure threshold value by a predefined pressure differential, so that a sufficiently large switching hysteresis is guaranteed. A brake light that is switched on once in the lower speed range (a speed range below the predefined speed threshold limit) stays on for a logical period of time, and brake light flickering is avoided with certainty. In a possible further exemplary embodiment of the invention, one braking pressure threshold value or both braking pressure threshold values can be designed in an applicable way. It may be advantageous to also vary the braking pressure threshold value as a function of the vehicle speed and/or the tilt angle of the vehicle and/or the weight of the vehicle. In order to bridge, if necessary, any pressure decays, a minimum follow-up time can also be implemented in an applicable way when the braking pressure threshold is not reached.

In order to generate a brake light signal that appears plausible to the following traffic, the exemplary brake light is preferably not switched on until the switch-on conditions have been present without interruption for a specified period of time. If within this period of time the absence of at least one switch-on condition is determined, even for just a short period of time, the time for the monitoring operation (without switching on the brake light) starts to run anew, causing a reset of a timer component.

If the vehicle is brought to a standstill by using an automatic braking operation, a different control of the brake light (in particular, the so-called high mount third brake lamp, arranged usually in the rear window area) is envisioned. A first exemplary design provides that at least one brake lamp that is switched on is held permanently in the on-state until a new restart operation is detected or until the vehicle is deactivated (stopped) by switching off the ignition, or until the function which controls the automatic braking function is deactivated by switching it off manually (for example by actuation of a switching element for activating or deactivating the function by the vehicle occupant).

A second exemplary design provides that after the standstill at least one brake lamp is held in the on-state for a specified period of time. and the at least one brake lamp is not switched off again until after this period of time has expired or when a restart operation is detected or when the stopping of the vehicle is detected or when the function is switched off manually, as described above.

In addition, other criteria may be considered. For example, a vehicle rear space monitoring device can be provided, and the control device may be designed in such a manner that the at least one brake lamp is switched off when the monitoring device has detected another vehicle that is entering the rear space of one's own vehicle and/or approaching said own vehicle. It is advantageous, if upon detection of another vehicle in the rear space of one's own vehicle, said at least one brake lamp is held in the on-state for an additional specified period of time and, following passage of this period of time, is switched off.

Furthermore, the vehicle rear space monitoring device in conjunction with the control device can also be designed in such a manner that upon the approach of another vehicle, which is approaching at a speed above a predefined boundary speed relative to one's own vehicle, the brake light is switched to a second brake light stage. In this second brake light stage, for example, the brightness of the activated brake lamps can be increased, and/or the illuminated area of the brake lamps can be enlarged, and/or additional brake lamps can be activated, and/or the flashing warning lamps can be activated.

Furthermore, the at least one brake lamp can stay in the on-state permanently or for a specified period of time even as a function of the presence of the grade or incline of the road (for example the brake lamp is switched off no later than at the next restart operation or upon deactivation of the vehicle).

Owing to the proposed switch-off and change-over scenarios, an unnecessary blinding of other road users can be avoided in a number of different situations, and an early warning signal can be sent.

In another further development of the control device with respect to switching off the brake light, the control device can be coupled with a navigation system; and said at least one brake lamp can be switched off as a function of the type of environment, determined by the navigation system. In this system, for example, one can distinguish between areas in-town and areas out-of-town, and different switch-off modes can be chosen for the various environments. As an alternative or in addition, a switch-off mode may be assigned as a function of the type of road that is determined (urban street, rural road, freeway) or the current speed limits. Therefore, the maximum allowable speed can be determined with the navigation system or any other detection system (for example, camera systems, traffic guidance systems, or the like) in order to determine the maximum allowable speed.

Furthermore, in the event of automatic braking operations at a very high system deceleration level, for example, automatic braking operations on freeways, the flashing warning system can also be switched on as soon as a correspondingly high deceleration level is reached. As an alternative, however, it is also envisioned not to activate the switch-on procedure of the flashing warning system until after the correspondingly high deceleration level has occurred, thus during a standstill phase of the vehicle.

The braking pressure, as a function of which the brake light is actuated, is determined in an advantageous exemplary manner by using pressure sensors of the brake hydraulic system or by using a model for calculating the braking pressure.

If, in the event of an automatic braking operation, the predefined boundary speed at which the brake light is supposed to be actuated as a function of the pressure (instead, for example, as a function of the deceleration), is not reached, the brake light is already actuated (and/or switched on) so that only the switch-off conditions are controlled as a function of the pressure. In cases where, for example, in a stop and go mode with automatic starting and braking operations, braking operations are initiated below the predefined boundary speed, the brake lamps are switched both on and off as a function of the pressure.

Other objects, advantages and novel features of the present invention will become apparent from the following detailed description of the invention when considered in conjunction with the accompanying drawings.

BRIEF DESCRIPTION OF THE DRAWINGS

The operating principle of the inventive device is explained in detail below with reference to the following Figures.

DETAILED DESCRIPTION OF THE DRAWINGS

Figure 1:
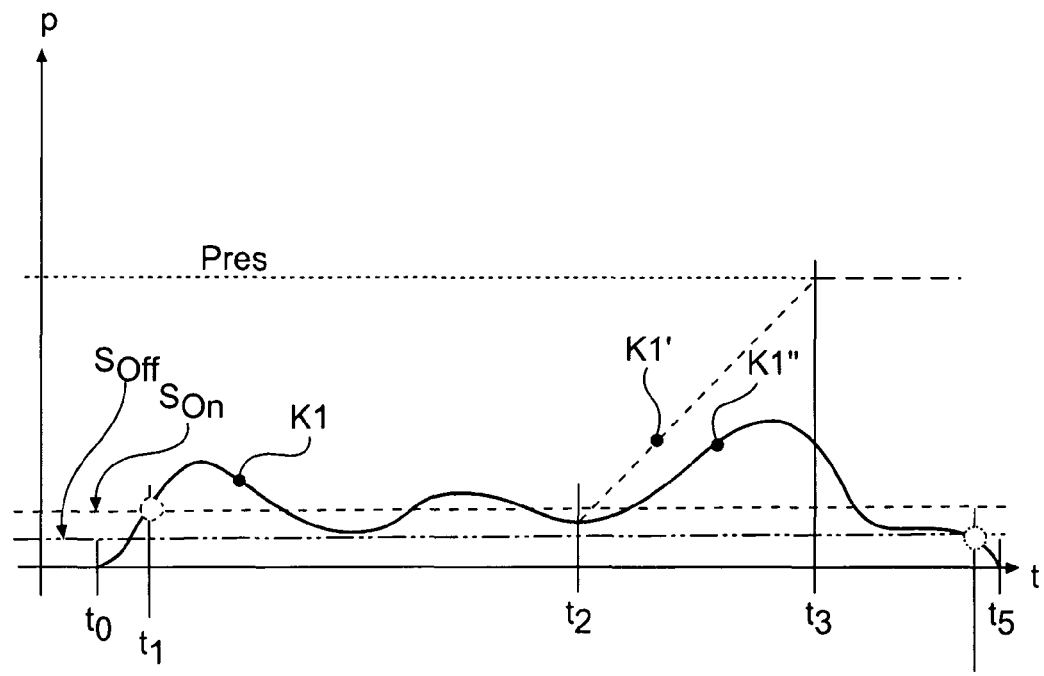
FIG. 1 depicts a braking pressure curve during a possible automatic braking operation in a motor vehicle.

FIG. 1 depicts an exemplary pressure curve (K1) of a braking pressure in the hydraulic circuit of a vehicle brake, which is activated during an automatic braking operation. One exemplary condition for actuating the brake light, according to the invention, may be the undershooting of a predefined speed threshold limit (and/or the presence of a vehicle speed less than or equal to the predefined speed threshold limit) during an automatic braking operation. In the present example, the presence of a vehicle speed below this speed threshold is assumed.

At the time $t_0$, an automatic braking operation is initiated by, for example, a driver assistance system, like a distance-dependent speed regulator (called ACC or active cruise control in BMW vehicles), and/or the automatic brake system is activated. Just a short time later, at time $t_1$, the predefined pressure threshold $S_{On}$ for switching on said at least one brake lamp is reached, according to the exemplary embodiment, and the brake light (one or more brake lamps) is switched on. Up until time $t_2$ the braking pressure may fluctuate about the switch-on threshold $S_{On}$, but never falls below the switch-off threshold $S_{Off}$. After time $t_2$, a number of different situations may occur as alternatives.

Figure 2:
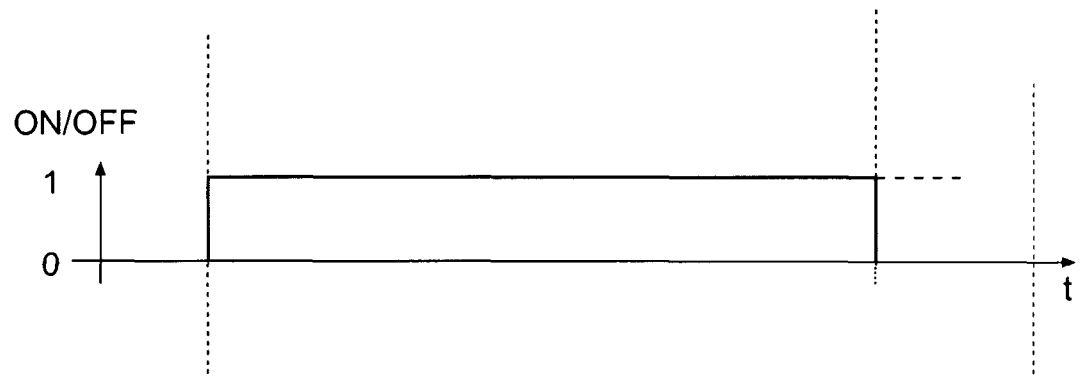
FIG. 2 depicts a potential actuation of the brake lights as a result of the braking pressure curve shown in FIG. 1.

According to a first exemplary situation, it is assumed that the vehicle at time $t_2$ was decelerated to a standstill by the automatic braking operation. Thereafter, the braking pressure reserve was automatically built up as far as a predefined braking pressure $p_{res}$, which is then maintained until the next restart operation. This event is shown in the dashed section of the curve K1'. FIG. 2 shows in an analogous manner a potential actuation of the brake lights, where the brake light is switched on at time $t_1$; and at time $t_3$, upon reaching the pressure reserve $p_{res}$, is switched off. In alternative exemplary embodiments, the brake light, as already described in the introduction, can be switched off in a different way, and also at a later point in time.

Figure 3:
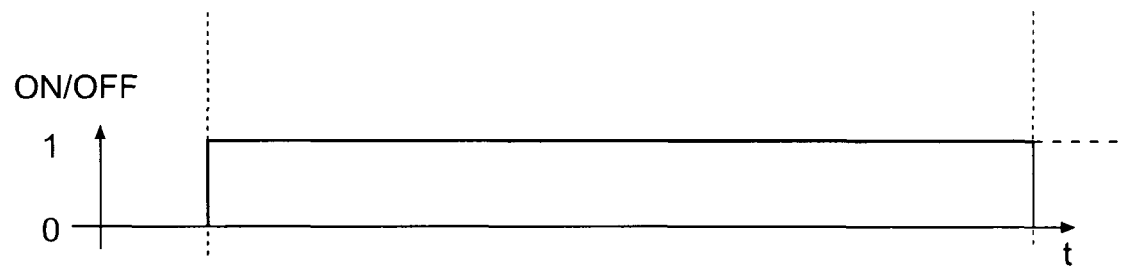
FIG. 3 depicts another exemplary embodiment of the actuation of the brake lights as a result of the braking pressure curve shown in FIG. 1.

According to a second exemplary situation, it is assumed that the vehicle continues to move at a crawl beyond the time $t_2$, until at time $t_5$ the automatic braking operation has terminated. In this case, before the termination of the automatic braking operation at time $t_5$, at time $t_4$ the switch-off braking pressure threshold $S_{Off}$ has not been reached, and the brake light is turned off. This event is depicted in the non-dashed section of the curve K1'' after time $t_2$. FIG. 3 shows, analogous to this braking operation curve, a potential actuation of the brake lights, where the brake light is switched on at time $t_1$ and at $t_4$ is switched off, since the switch-off braking pressure threshold $S_{Off}$ has not been reached. In this embodiment as well, the actual switching off, as described in the introductory part, may be designed in a different way. In order to bridge any pressure undershooting that might occur, the brake light is not switched off until after a timer has run down. The timer may be restarted as soon as the switch-off threshold is reached.

According to the exemplary embodiment shown in FIGS. 1 to 3, a number of different types of typical driving situations may occur, in particular in the event that a vehicle in ACC mode with an automated distance regulating system is following another vehicle. Such situations will be explained in detail below.

Figure 4:
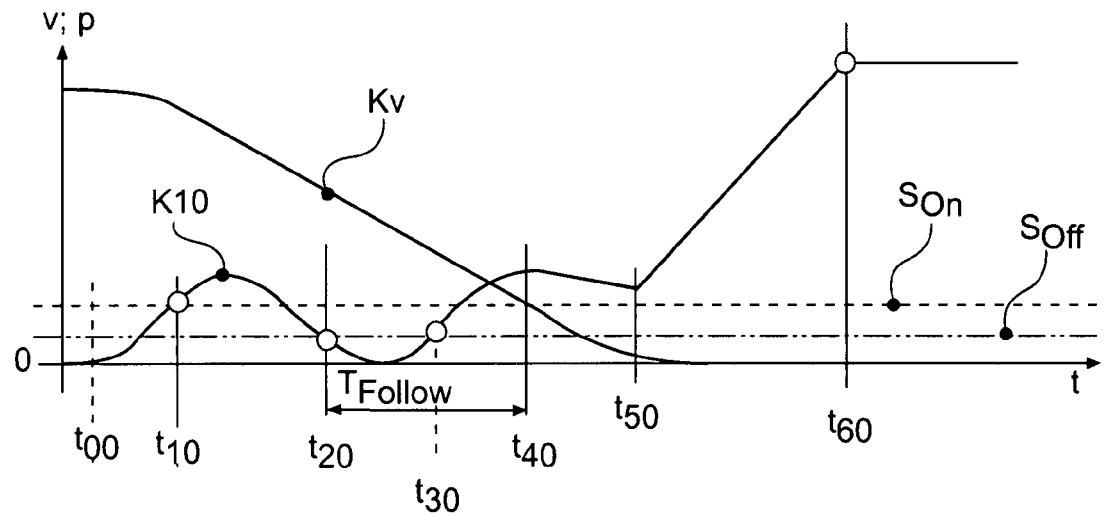
FIG. 4 depicts a second exemplary braking pressure curve during an automatic braking operation in a motor vehicle.
Figure 5:
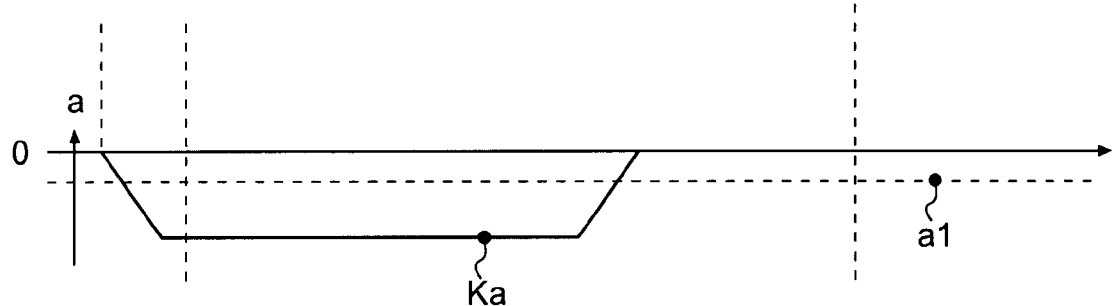
FIG. 5 depicts the vehicle deceleration, resulting from the automatic braking operation shown in FIG. 4.
Figure 6:
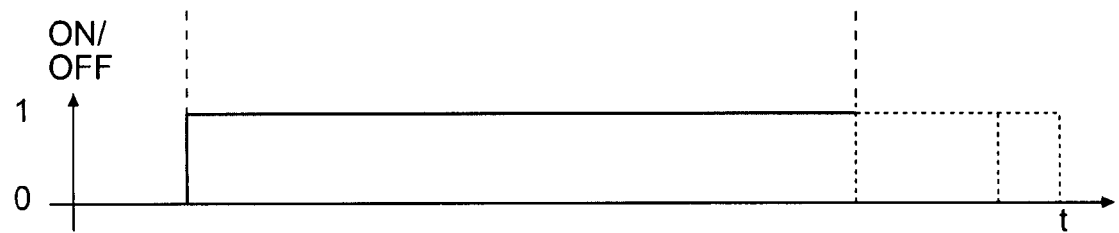
FIG. 6 depicts an exemplary embodiment of the actuation of the brake lights as a result of the braking pressure curve shown in FIG. 4.

FIGS. 4 to 6 show a driving situation, where during the vehicle deceleration, resulting from the automatic braking operation, the automatically adjusted braking pressure drops down substantially to zero (zero braking pressure) despite the continued deceleration, and then immediately builds up again in order to react to the leading vehicle as a function of the distance and speed control. In this exemplary situation the brake light is not supposed to be switched off and then immediately switched on again. Such an on and off switching of the brake light can be avoided in this case even after the released braking pressure, for example due to undershooting of the switch-off threshold and/or zero braking pressure, if the brake light stays on for a specified period of time. If the vehicle is decelerated, for example after undershooting the switch-off threshold $S_{Off}$, a (time) counter with a predefined follow-up time $T_{Follow}$ is actuated. During this time frame having the time period $T_{Follow}$, the brake light remains activated. If within the follow-up time $T_{Follow}$ the braking pressure automatically rises again owing to the driving function (e.g., ACC distance/speed control) and exceeds, for example, the predefined switch-off threshold $S_{Off}$, the counter is reset again, and the brake light remains activated. If within the follow-up time $T_{Follow}$ the switch-off threshold $S_{Off}$ is not reached and/or exceeded, the brake light is switched off.

FIG. 4 shows, analogous to FIG. 1, another exemplary pressure curve (K 10) of a braking pressure in the hydraulic circuit of a vehicle brake that is activated during a braking operation. The same boundary conditions as in the example, according to FIG. 1, apply analogously here. At time $t_{00}$ an automatic braking operation is initiated, so that the activated brake system automatically adjusts the braking pressure as a function of the vehicle operating conditions, according to the curve K 10. In parallel to the braking pressure of the brake system, FIG. 4 shows the speed of the vehicle with the curve Kv, and FIG. 5 shows the resulting deceleration of the vehicle associated with the curve Ka. Owing to the brake activation at time $t_{00}$, after this point in time the curve Ka shows a parallel deceleration of the vehicle. At time $t_{10}$ the braking pressure reaches the predefined switch-on threshold $S_{On}$ for activating the brake light (FIG. 6). In the next phase of the curve the braking pressure shows greater fluctuations, and drops for the first time at time $t_{20}$ below the switch-off threshold $S_{Off}$ for deactivating the brake light. However, according to the exemplary illustrated embodiment, the brake light is not immediately deactivated owing to the undershooting of the switch-off threshold $S_{Off}$. Rather, the brake light stays on, and at time $t_{20}$ a counter with the predefined follow-up time $T_{Follow}$ is activated. Within the follow-up time $T_{Follow}$, the braking pressure continues to be monitored. Since in the illustrated exemplary embodiment the braking pressure already exceeds again the switch-off threshold $S_{Off}$ at time $t_{30}$, before the passage of the follow-up time $T_{Follow}$ at $t_{40}$, the brake light stays active. The time counter is reset again at this point in time so that, when once again the switch-off threshold is not reached, the process can be repeated again. As an alternative, instead of the switch-off threshold $S_{Off}$, another pressure threshold, for example the switch-on threshold $S_{On}$—can, also be monitored and can be defined as a condition for "further activation" of the brake light. In the illustrated exemplary embodiment, the vehicle comes to a standstill at time $t_{50}$. After this time, the braking pressure reserve builds up again in an advantageous manner, until it reaches a predefined braking pressure $p_{res}$, which is then maintained until the next restart operation. On reaching the holding braking pressure $p_{res}$, the brake light is deactivated. As an alternative the brake light (contrary to the switching-off operation at time $t_{60}$ in FIG. 6) could also continue to stay on and be deactivated only at a later time, for example following passage of a waiting period or after detection of another vehicle or the like entering into the rear space of one's own vehicle.

Figure 7:
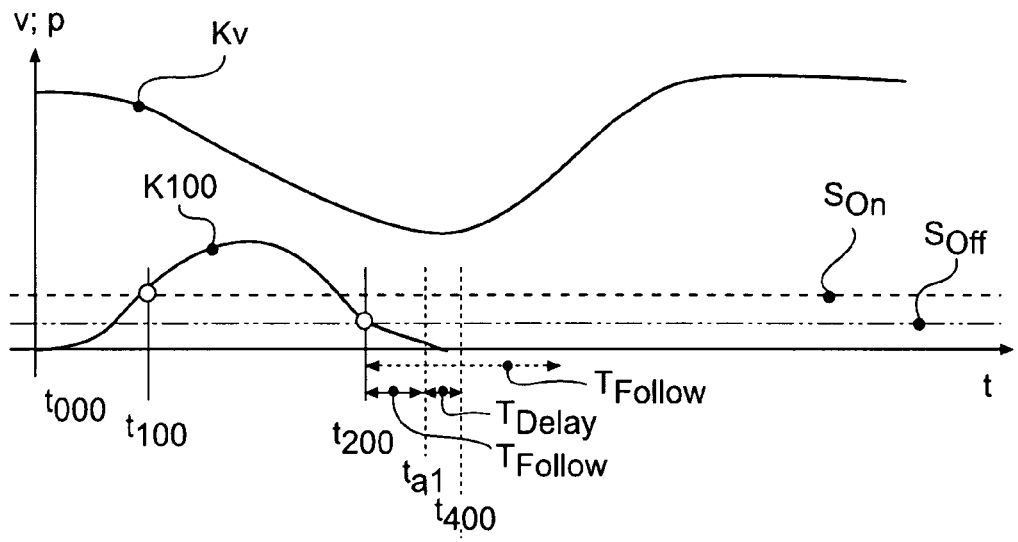
FIG. 7 depicts a third exemplary braking pressure curve during an automatic braking operation in a motor vehicle.
Figure 8:
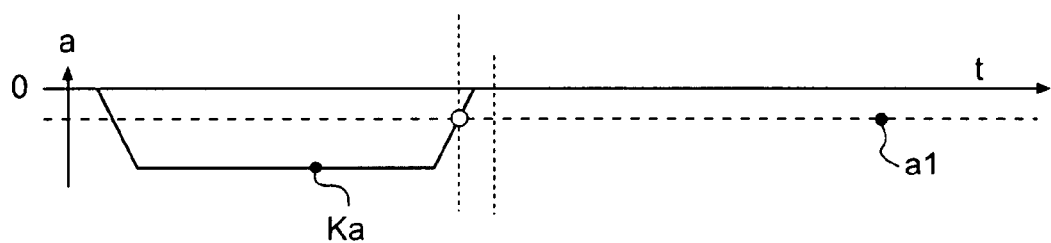
FIG. 8 depicts the vehicle deceleration, resulting from the automatic braking operation shown in FIG. 7.
Figure 9:
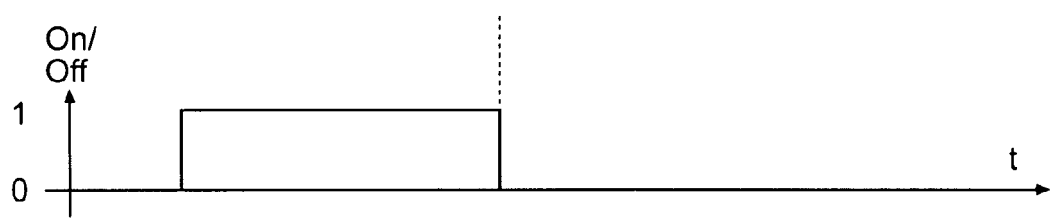
FIG. 9 depicts an exemplary actuation of the brake lights as a result of the braking pressure curve shown in FIG. 7.

In the exemplary case in which, starting from the deceleration (thus immediately following a terminated deceleration phase) an acceleration occurs, the brake light may not stay on, as described above with reference to FIGS. 4 to 6, for the duration of the follow-up time $T_{Follow}$, even though the switch-off threshold $S_{Off}$ was not reached, in this case, there is simultaneously an acceleration operation. This special case is explained with reference to FIGS. 7 to 9. In parallel to the monitoring of the braking pressure p for undershooting or overshooting predefined braking pressure threshold values, the vehicle deceleration a is monitored for at least one predefined deceleration threshold value a1. In the exemplary case where the vehicle accelerates out of a deceleration phase (in which at time $t_{000}$ the braking pressure automatically increases, and at time $t_{100}$ the switch-on threshold $S_E$ on for switching on the brake light is reached), the automatically built-up braking pressure p is reduced and automatically falls below the predefined switch-off threshold $S_{Off}$. At this time ($t_{200}$), a counter with the time period of the follow-up time $T_{Follow}$ is activated in a manner analogous to the case described above (FIGS. 4 to 6), and the braking pressure p is monitored correspondingly. In parallel, the vehicle deceleration a is monitored. In the illustrated embodiment the value of the vehicle deceleration a (when seen in absolute or amount terms) falls at time $t_{a1}$ below the predefined deceleration threshold value a1 (|a|<|a1|). As the deceleration threshold value a1 is undershot, a second (time) counter is started. Its specified period of time (delay time $T_{Delay}$) is dimensioned shorter than the follow-up time $T_{Follow}$ of the first counter. In the exemplary case where, within the delay time $T_{Delay}$ (on reaching the time ($t_{400}$)), the vehicle deceleration a is still less (and/or less than or equal) to the predefined deceleration threshold value a1, the brake light is deactivated even before the passage of the follow-up time $T_{Follow}$ (with a shorter follow-up time ($T_{Follow}'$)) so that there is no discrepancy between a vehicle that is accelerating out of an automatic decelerating operation and its brake light display.

In addition to or as an alternative to the monitoring of the deceleration threshold a1, the sign of the deceleration signal a can also be watched so that, when the sign of the deceleration signal changes owing to a very sizeable acceleration, the brake lights are deactivated.

Furthermore, another deceleration threshold value (with the same sign but smaller in terms of amount) can be monitored during the delay period $T_{Delay}$ so that, when the other deceleration threshold value is exceeded before passage of the delay time $T_{Delay}$, a deactivation of the brake lights can be carried out.

The above described designs and measures ensure that the brake lights are actuated quickly and in accordance with the situation. In this respect the second time counter ensures, on the one hand, that pulse-like signal peaks in the deceleration signal do not result in the brake light being switched off too early, and, on the other hand, ensures that in the event that the acceleration operation is initiated (automatically or manually) starting from the automatic deceleration, a too-long activation of the brake lights is prevented.

The invention provides a reliable brake light control for the lower speed ranges. In particular in automatic braking operations that are triggered by driver assistance systems, like speed regulating systems, spacing-dependent speed regulating systems, automated stop and go mode, and also in the case of automated emergency brake systems or the like, a reliable flicker-free brake light control is guaranteed until the vehicle comes to a standstill.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for controlling brake lights in a motor vehicle having a brake system actuated by outside forces, comprising:
   a control device for actuating the brake system in such a manner that an automatic braking operation is executable as a function of vehicle operating conditions; and
   at least one brake lamp, actuatable by one of the control device and a separate control unit;
   wherein the one of the control device and the control unit, during an automatic braking operation, switches on the at least one brake lamp below a predefined boundary speed, as a function of one of a braking pressure determined in an activated brake of the vehicle, and a parameter correlating to the braking pressure.

2. Device, as claimed in claim 1, wherein the one of the control device and the control unit is adapted to predefine the boundary speed is to be applicable, and is variable substantially as a function of at least one of a speed of the vehicle and a tilt angle of the vehicle about a transverse axis of the vehicle.

3. Device, as claimed in claim 1, wherein the one of the control device and the control unit is designed to, during an automatic braking operation, switch on the brake lamp above the predefined boundary speed, as a function of a determined vehicle deceleration.

4. Device, as claimed in claim 1, wherein the one of the control device and the control unit is adapted to, during an automatic braking operation, switch off the brake lamp below a predefined boundary speed, as a function of at least one of a braking pressure determined in the activated brake of the vehicle, and a parameter correlating to the braking pressure.

5. Device, as claimed in claim 1, wherein the one of the control device and the control unit is adapted to, on reaching or overshooting a predefined switch-on braking pressure threshold value, switch on the at least one brake lamp.

6. Device, as claimed in claims 5, wherein the one of the control device and the control unit is adapted to apply at least one of the predefined switch-on braking pressure threshold value and a switch-off braking pressure threshold value as a function of at least one of a speed of the vehicle, a tilt angle about a transverse axis of the vehicle and a weight of the vehicle.

7. Device, as claimed in claim 1, wherein the one of the control device and the control unit is adapted to, on reaching or undershooting a predefined switch-off braking pressure threshold value, switch-off the at least one brake lamp.

8. The device according to claim 7, wherein the at least one brake lamp is switched off when the predefined switch-off braking pressure threshold is one of equal to and less than the switch-on braking pressure threshold value.

9. Device, as claimed in claim 1, wherein the one of the control device and the control unit is adapted to maintain the at least one brake lamp switched off until switch-on conditions are present without interruption for a specified period of time.

10. Device, as claimed in claim 1, wherein the one of the control device and the control unit is adapted to maintain the at least one brake lamp switched on until specified conditions for switching off are present without interruption for a specified period of time.

11. Device, as claimed in claim 1, wherein the one of the control device and the control unit is adapted to, in the case that following an automatic braking operation the vehicle comes to a standstill, said at least one brake lamp to stay on for a duration of time in which the vehicle is at a standstill.

12. Device, as claimed in claim 11, wherein the one of the control device and the control unit is coupled with a navigation system, and said at least one brake lamp is switched off as a function of a current environment, comprising one of an urban environment and a rural environment.

13. Device, as claimed in claim 12, wherein said at least one brake lamp is switched off as a function of a current type of road being traveled comprising one of an urban street, a rural road, and a freeway.

14. The device according to claim 11, wherein the at least one brake lamp comprises a high mount third brake lamp.

15. Device, as claimed in claim 1, wherein the one of the control device and the control unit is adapted to, when following an automatic braking operation the vehicle comes to a standstill, cause said at least one brake lamp to stay on for a duration of a specified on-time period and, following passage of the on-time period, to be automatically switched off.

16. Device, as claimed in claim 1, wherein the one of the control device and the control unit is coupled to a vehicle rear space monitoring device and is adapted to cause, when following an automatic braking operation the vehicle comes to a standstill, said at least one brake lamp, to be automatically switched off when the vehicle rear space monitoring device detects a second vehicle entering a rear space of the vehicle.

17. Device, as claimed in claim 1, wherein the one of the control device and the control unit is adapted to cause, during one of an automatic braking operation causing a vehicle deceleration that is equal to or greater than a predefined boundary deceleration of the vehicle and with a braking pressure that is equal to or greater than a predefined boundary braking pressure, activation of the flashing warning light system in addition to said at least one brake lamp.

18. Device, as claimed in claim 1, further comprising a pressure sensor for detecting the braking pressure prevailing in an activated brake of the vehicle.

19. Device, as claimed in claim 1, wherein the one of the control device and the control unit is adapted to determine the pressure prevailing in the activated brake of the vehicle by using a computational model.

20. Device, as claimed in claim 1, wherein the one of the control device and the control unit is coupled to a vehicle rear space monitoring device and is adapted to cause, in the case of an approaching vehicle which is moving in a rear space of the vehicle at a speed above a predefined boundary speed, the brake light to be switched to a second brake light stage, the second brake light stage comprising at least one of an increased brightness of the activated brake lamps, an enlarged illuminated area of the brake lamps, additional brake lamps being activated, and activating flashing warning lamps.

21. Device, as claimed in claim 1, wherein the one of the control device and the control unit is adapted to cause during a deceleration operation initiated by an automatic braking operation and during which a braking pressure is reduced to below a switch-off threshold, is built up again within a specified follow-up period after undershooting the switch-off threshold, the brake light to not be switched off upon undershooting the switch-off threshold, and when, within the specified follow-up period the switch-off threshold is not exceeded again, the brake light to be switched off.

22. Device, as claimed in claim 21, wherein the one of the control device and the control unit is adapted to monitor the vehicle deceleration, and, triggered by reaching below a predefined lower vehicle deceleration limit, to monitor whether within a delay time dimensioned shorter that the follow-up time, to further cause one of switching-off the at least one brake light when the vehicle deceleration is less than or equal to the lower vehicle deceleration and in the case that the vehicle deceleration for the period of the delay time is less than or equal to the lower vehicle deceleration limit, and to switch-off the brake light when the vehicle deceleration falls below a second predefined vehicle deceleration limit, which is substantially smaller than the first vehicle deceleration limit, and when during the delay time the vehicle deceleration falls below the second vehicle deceleration limit, and to switch-off the brake light when the signal of the vehicle deceleration is monitored for a change in the sign, and when during the delay time a sign change is detected.

23. Device, as claimed in claim 1, wherein the one of the control device and the control unit is adapted to, on initiating an acceleration operation following a deceleration operation, continue monitoring the vehicle, and on detecting a vehicle acceleration, switch-off the at least one brake light.

\* \* \* \* \*